R. R. YOHEY.
LUBRICATING DEVICE FOR PULLEYS.
APPLICATION FILED SEPT. 30, 1907.
903,259.
Patented Nov. 10, 1908.
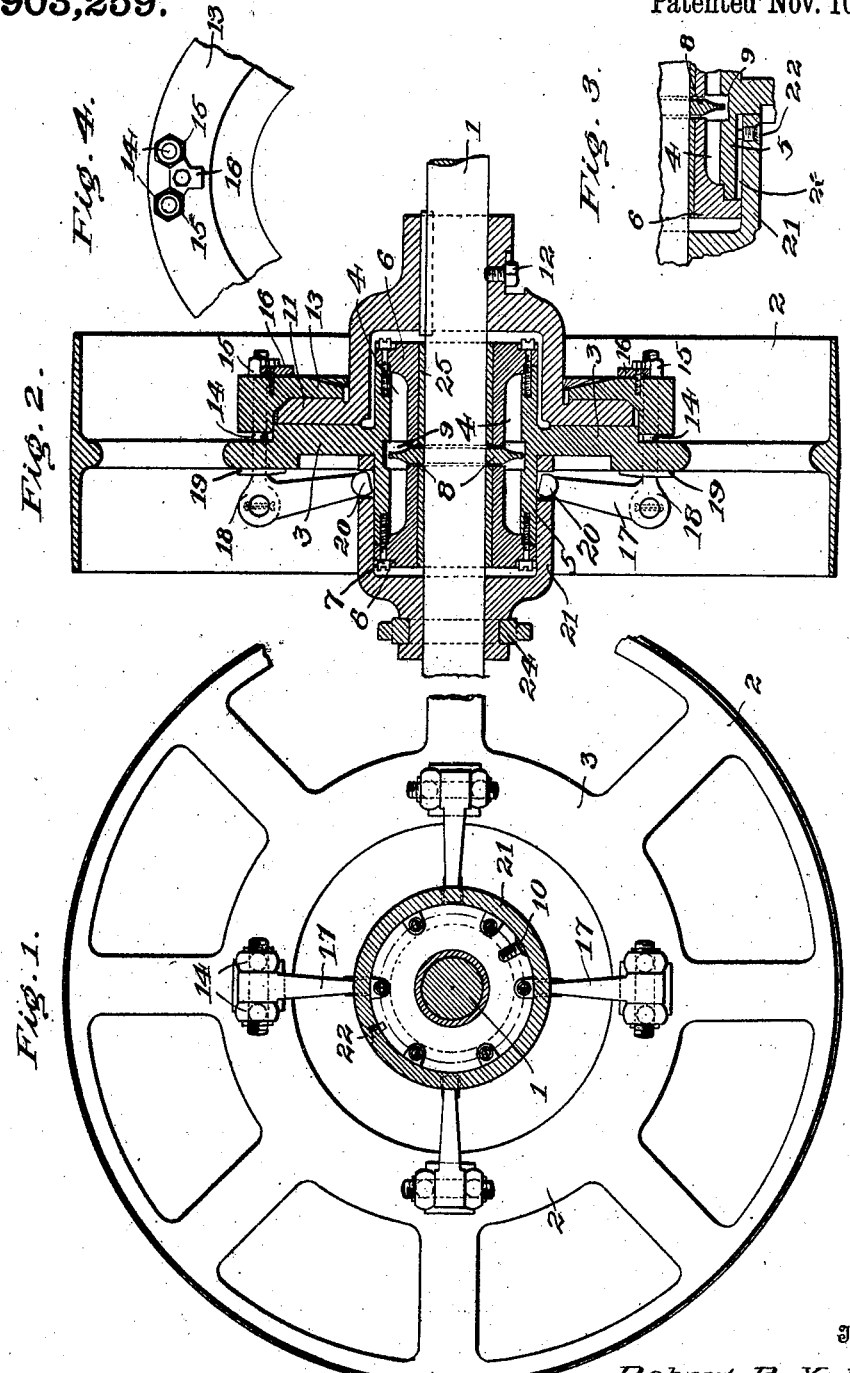
Inventor
Robert R. Yohey.
Witnesses
By
Attorneys

UNITED STATES PATENT OFFICE.

ROBERT R. YOHEY, OF TIPPECANOE CITY, OHIO.

LUBRICATING DEVICE FOR PULLEYS.

No. 903,259.  Specification of Letters Patent.  Patented Nov. 10, 1908.

Application filed September 30, 1907. Serial No. 395,289.

*To all whom it may concern:*

Be it known that I, ROBERT R. YOHEY, a citizen of the United States, residing at Tippecanoe City, in the county of Miami and State of Ohio, have invented certain new and useful Improvements in Lubricating Devices for Pulleys, of which the following is a specification.

The present invention is in the nature of an improved lubricating device for pulleys, and has for its primary object to design a device of this character which is simple and durable in its construction and will require but little attention from an attendant.

For a full description of the invention and the merits thereof and also to acquire a knowledge of the details of construction and the means for effecting the result, reference is to be had to the following description and accompanying drawings, in which:

Figure 1 is a side elevation of a pulley embodying the invention, parts being shown in section. Fig. 2 is a vertical sectional view through the same. Fig. 3 is a detail sectional view through a portion of the hub. Fig. 4 is a detail view of one of the locking plates utilized to prevent the nuts from working loose.

Corresponding and like parts are referred to in the following description and indicated in all the views of the drawings by the same reference characters.

Referring to the drawing the numeral 1 designates the shaft which may receive power from any suitable source, and 2 a pulley loosely mounted upon the shaft. The hub of the pulley is provided with an oil chamber 4 and comprises a sleeve 5 shown in the present instance as cast integral with the body portion of the pulley, and bushings 6 extending within the sleeve and secured to the opposite ends thereof by fastening members such as the screws 7, the inner ends of the bushings being cut away upon their exterior as shown. A collar 8 having the periphery thereof beveled from opposite sides is loose upon the shaft between the inner extremities of the two bushings 6, the entire periphery of the collar extending within an annular groove 9 in the interior of the sleeve 5. This construction admits of the oil within the chamber 4 being utilized to practically the last drop, since when the oil becomes low it runs into the groove 9 owing to the action of centrifugal force and comes into contact with the collar 8 which leads it to the shaft. An opening is formed in the sleeve 5 through which the oil is turned into the chamber 4 and the said opening is normally closed by means of the plug 10.

For the purpose of illustration the lubricating device is shown as employed in connection with the hereinafter described clutch mechanism although the same constitutes no part of the present invention. The pulley may be formed of cast iron or other suitable material and the central portion thereof surrounding the hub is in the nature of a web 3 one of the faces of which constitutes a friction surface, a disk 11 designed to frictionally engage the said web being keyed upon the shaft 1 so as to rotate therewith. The central portion of the disk is preferably pressed outwardly as shown to receive one end of the hub and the said disk is also preferably locked against longitudinal movement upon the shaft by means of a set screw 12. A ring 13 is utilized to frictionally engage the outer face of the disk 11, the said ring being provided at its periphery with the bolts 14 which pass loosely through the pulley 2. These bolts 14 are arranged in pairs and after passing through the ring 13 are capped by the nuts 15 which are locked against working loose by means of the locking plates 16 which are bolted or otherwise detachably secured to the ring. Pivoted between the opposite extremities of each pair of the bolts 14 is a lever 17, the said levers being provided with a cam portion 18 adapted to engage a beveled wearing plate 19 upon the pulley and to coöperate therewith to draw the ring 13 inwardly toward the web 3 of the pulley and clamp the disk 11 between the said members. The various levers 17 extend inwardly toward the hub and have their extremities received loosely within openings 20 in the shifting sleeve 21 which is slidably mounted upon the hub. For the purpose of locking this shifting sleeve against independent rotation upon the hub the same is provided with a screw 22 the extremity of which is received within a groove or guide way 23 in the sleeve 5, the ends of the groove coöperating with the screw to limit the sliding movement of the shifting sleeve. A shifting ring 24 is loosely mounted upon the shifting sleeve 21 for engagement with a shifting lever of any approved type.

With this construction it will be readily apparent that when the shifting sleeve 21 is moved outwardly the cam portions 18 of the levers 17 are swung out of engagement with the beveled wearing plates 19 and the ring 13 permitted to move away from the web 3 in such a manner as to release the disk 11. The pulley is then loose upon the shaft which rotates independently of the same. However when the shifting sleeve is moved in the opposite direction the cams 18 upon the levers are brought into engagement with the wearing plates 19 and the bolts 14 drawn inwardly in such a manner as to clamp the disk 11 between the ring 13 and web 3 and lock the pulley upon the shaft. Should the friction surfaces of the various members become worn compensation for the same can be readily made by removing the locking plates 16 and tightening the nuts 15. It may also be mentioned that the beveled wearing plates 19 are detachably applied to the pulley and can be quickly replaced when necessary. When the shifting sleeve 21 is thrown outwardly to the limit of its movement the plug 10 can be removed from the sleeve 5 for the purpose of filling the oil chamber 4. It may be mentioned that in the present instance the portions of the bushings 6 in actual contact with the shaft are formed of Babbitt metal or brass as indicated at 25.

Having thus described the invention, what is claimed as new is:

In a lubricating device, the combination of a shaft, a pulley mounted upon the shaft, the hub of the pulley comprising a sleeve having an internal diameter larger than the shaft, bushings extending within the sleeve from opposite ends thereof and receiving the shaft, the inner ends of the bushings being cut-away exteriorly to coöperate with the sleeve to form an annular oil chamber and an annular groove being formed in the interior of the sleeve opposite the space between the inner extremities of the bushings, and a collar loose upon the shaft between the bushings, the periphery of the collar being beveled from opposite sides and the entire periphery projecting within the annular groove in the sleeve and serving to lead the oil from the groove to the shaft.

In testimony whereof, I affix my signature in presence of two witnesses.

ROBERT R. YOHEY. [L. S.]

Witnesses:
RAYMOND A. KERR,
HELEN MURPHY.